United States Patent
Jo et al.

(10) Patent No.: US 12,176,513 B2
(45) Date of Patent: Dec. 24, 2024

(54) MULTILAYER ELECTRODE FOR SECONDARY BATTERY AND FABRICATION METHOD THEREOF

(71) Applicant: SK INNOVATION CO., LTD., Seoul (KR)

(72) Inventors: Byoung Wook Jo, Daejeon (KR); Byung Chan Kang, Daejeon (KR); Yong Hee Kang, Daejeon (KR); Sung Jun Park, Daejeon (KR); Hyo Sung Lim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 221 days.

(21) Appl. No.: 17/509,688

(22) Filed: Oct. 25, 2021

(65) Prior Publication Data
US 2022/0131130 A1 Apr. 28, 2022

(30) Foreign Application Priority Data
Oct. 26, 2020 (KR) .................. 10-2020-0138936

(51) Int. Cl.
H01M 4/04 (2006.01)
H01M 4/36 (2006.01)

(52) U.S. Cl.
CPC ........ *H01M 4/0471* (2013.01); *H01M 4/0404* (2013.01); *H01M 4/366* (2013.01)

(58) Field of Classification Search
CPC ... H01M 4/0471; H01M 4/0404; H01M 4/366
See application file for complete search history.

(56) References Cited

U.S. PATENT DOCUMENTS

2016/0013480 A1* 1/2016 Sikha .................. H01M 4/043
427/126.6
2019/0027740 A1 1/2019 Lee et al.

FOREIGN PATENT DOCUMENTS

| CN | 109873119 A | 6/2019 |
| EP | 3591749 A1 | 1/2020 |
| JP | 5051988 B2 | 10/2012 |
| JP | 2013134913 A * | 7/2013 |

(Continued)

OTHER PUBLICATIONS

Hawley et al "Beneficial rheological properties of lithium-ion battery cathode slurries from elevated mixing and coating temperatures" Journal of Energy Storage, vol. 26, 2019 ISSN 2352-152X (Year: 2019).*

(Continued)

*Primary Examiner* — Ula C Ruddock
*Assistant Examiner* — Olivia Mason Ruggiero
(74) *Attorney, Agent, or Firm* — IP & T GROUP LLP

(57) ABSTRACT

The present invention provides a fabrication method of a multilayer electrode for a secondary battery including: (a) preparing two or more electrode slurries each containing an electrode active material, a binder, and a solvent and heating at least one electrode slurry selected from the prepared two or more electrode slurries to a temperature lower than a boiling point ($T_b$) of the solvent contained in the selected electrode slurry; (b) coating the two or more electrode slurries on a current collector; and (c) cooling the coated two or more electrode slurries.

9 Claims, 2 Drawing Sheets
(1 of 2 Drawing Sheet(s) Filed in Color)

EXAMPLE 1

COMPARATIVE EXAMPLE 3

(56) References Cited

FOREIGN PATENT DOCUMENTS

| KR | 10-2012-0124077 A | | 11/2012 | | |
|----|-------------------|---|---------|---|---|
| KR | 10-2015-0132463 A | | 11/2015 | | |
| KR | 20160123050 A | * | 10/2016 | ............ | H01M 10/04 |
| KR | 10-2019-0064480 A | | 6/2019 | | |
| KR | 102040511 B1 | | 11/2019 | | |
| KR | 10-2020-0011347 A | | 2/2020 | | |
| WO | WO-2013147007 A1 | * | 10/2013 | ............ | C08L 51/006 |
| WO | WO-2019102900 A1 | * | 5/2019 | ............ | H01M 10/04 |

OTHER PUBLICATIONS

Extended European Search Report for the European Patent Application No. 21204827.6 issued by the European Patent Office on Mar. 31, 2022.
Office Action for the European Patent Application No. 21204827.6 issued by the European Patent Office on Jun. 30, 2023.
Office Action for the Chinese Patent Application No. 202111238051.4 issued by the Chinese Patent Office on Apr. 28, 2023.
Office Action for Korean Patent Application No. 10-2020-0138936 issued by the Korean Patent Office on Sep. 13, 2024.

* cited by examiner

MULTILAYER ELECTRODE FOR SECONDARY BATTERY AND FABRICATION METHOD THEREOF

CROSS-REFERENCE TO RELATED APPLICATIONS

This application claims priority under 35 U.S.C. §119 to Korean Patent Application No. 10-2020-0138936, filed on Oct. 26, 2020, in the Korean Intellectual Property Office, the disclosure of which is incorporated herein by reference in its entirety.

TECHNICAL FIELD

The following disclosure relates to a multilayer electrode for a secondary battery and a fabrication method thereof.

BACKGROUND

Recently, in accordance with an increase in the demand for electronic devices such as mobile devices, development of technologies for weight reduction and miniaturization of electrochemical batteries (secondary batteries) for increasing portability of the electronic devices has been expanded. In addition to such a trend, in accordance with a global trend toward tightening regulations on fuel efficiency and exhaust gas of automobiles, the growth of an electric vehicle (EV) market has been accelerated, such that the development of high-output and large-capacity batteries to be used in such electric vehicles has been demanded.

As a method for improving a quality and performance of the battery, an electrode having a multilayer structure has been recently studied. Specifically, an electrode of which adhesion between a current collector and an electrode active material layer (lower layer) and a resistance are improved may be fabricated by fabricating an electrode having a double-layer structure in which a content of a binder is higher in the electrode active material layer of the lower side in contact with the current collector than in an upper layer. However, in a fabrication method of a multilayer electrode, in a process of laminating and drying electrode slurries having different compositions, an interlayer mixing problem of binders in the electrode slurries occurs. That is, a migration phenomenon of the binders occurs, such that binders in the electrode active material layers of the upper layer and the lower layer are mixed with each other without being maintained in binder distributions in initial slurries after the electrode is fabricated, and thus, a multilayer form may not be maintained. Furthermore, in a case where a mixing degree is severe, the upper layer and the lower layer are completely mixed with each other to form a single layer, such that the above-described effect of the electrode having the multilayer structure disappears.

Therefore, research and development for a technology for making thicknesses of each electrode active material layer in the multilayer electrode uniform by securing fluidity of the electrode slurries and minimizing interlayer mixing by suppressing the migration phenomenon of the binders in the electrode slurries in a drying process have been required.

SUMMARY

An embodiment of the present invention is directed to solve a problem caused by migration of binders due to a flow of a low-viscosity solvent, that is, a problem that adhesion between a current collector and an electrode active material layer is decreased, at the time of performing drying in a process of forming stacked electrode active material layers by coating and drying two or more electrode slurries on the current collector.

In one general aspect, a fabrication method of a multilayer electrode for a secondary battery includes: (a) preparing two or more electrode slurries each containing an electrode active material, a binder, and a solvent and heating at least one electrode slurry selected from the prepared two or more electrode slurries to a temperature lower than a boiling point (Tb) of the solvent contained in the selected electrode slurry; (b) coating the two or more electrode slurries on a current collector; and (c) cooling the coated two or more electrode slurries.

Contents of binders with respect to slurry solids in the two or more electrode slurries may be different from each other.

An electrode slurry in which a content of a binder with respect to the slurry solid is higher, of the two or more electrode slurries may be coated on a place close to the current collector.

In the coating (b) of the two or more electrode slurries, the two or more electrode slurries may be simultaneously or sequentially coated on the current collector.

The fabrication method of a multilayer electrode for a secondary battery may further include (d) drying the cooled two or more electrode slurries.

The drying may be performed at a temperature of 90° C. or more and less than 180° C. for 45 seconds to 5 minutes.

A heating temperature (T) of the heating may satisfy the following Relational Equation 1:

$$0.3T_b < T < 0.9T_b \quad \text{[Relational Equation 1]}$$

wherein $T_b$ is the boiling point of the solvent contained in the selected electrode slurry.

The selected electrode slurry may satisfy the following Relational Equations 2 and 3, and a viscosity ($A_1$) of the electrode slurry before being heated may be 20,000 cp or more, $$1.3 \le A_1/A_2 \le 12 \quad \text{[Relational Equation 2]}$$

$$1.1 \le A_3/A_2 \le 10 \quad \text{[Relational Equation 3]}$$

wherein $A_1$ is a viscosity of the selected electrode slurry before being heated, $A_2$ is a viscosity of the heated electrode slurry of the selected electrode slurry, and $A_3$ is a viscosity of the cooled electrode slurry of the selected electrode slurry.

The cooling may be performed at a temperature of 10 to 30° C. for 1 to 60 seconds.

A content of a solid of each of the two or more electrode slurries may be more than 50 wt % and 80 wt % or less.

In another general aspect, a multilayer electrode for a secondary battery includes: a current collector; a first electrode layer formed on the current collector and containing a first electrode active material and a first binder; and a second electrode layer formed on the first electrode layer and containing a second electrode active material and a second binder, wherein a content (wt %) of the first binder with respect to a total weight of the first electrode layer is higher than a content (wt %) of the second binder with respect to a total weight of the second electrode layer, and an adhesion of the first electrode layer to the current collector is 0.2 N/cm or more.

In the multilayer electrode, a difference between a maximum loading value and a minimum loading value of the electrode layer at five or more positions having regular intervals in a length direction may be 10% or less of a total loading average value.

The first electrode layer and the second electrode layer may satisfy the following Relational Equation 4:

$$0.5 < R_e / R_s < 1 \qquad \text{[Relational Equation 4]}$$

wherein $R_s$ is a difference ($B_{1s}$-$B_{2s}$) between a content ($B_{1s}$) (wt %) of a binder with respect to a solid in a first electrode slurry coated on the current collector in order to form the first electrode layer and a content ($B_{2s}$) (wt %) of a binder with respect to a solid in a second electrode slurry coated on the first electrode slurry in order to form the second electrode layer, and $R_e$ is a difference ($B_{1e}$-$B_{2e}$) between a content ($B_{1e}$) (wt %) of a binder in the first electrode layer in the multilayer electrode and a content ($B_{2e}$) (wt %) of a binder in the second electrode layer in the multilayer electrode.

In still another aspect, a secondary battery includes: the multilayer electrode according to an embodiment of the present invention; a separator; and an electrolyte.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

Figure 1:
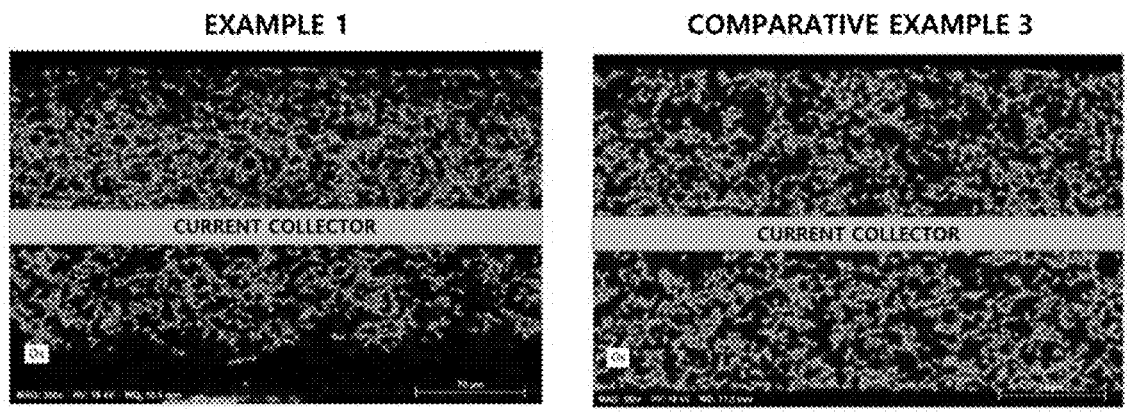
FIG. 1 is views illustrating images of cross sections of multilayer electrodes according to Example 1 and Comparative Example 3, captured by a scanning electron microscope.

Advantages and features of the present invention and methods accomplishing them will become apparent from the following detailed description of embodiments with reference to the accompanying drawings. However, the present invention is not limited to embodiments to be described below, but may be implemented in various different forms, these embodiments will be provided only in order to make the present invention complete and allow one of ordinary skill in the art to which the present invention pertains to completely recognize the scope of the present invention, and the present invention will be defined by the scope of the claims. Hereinafter, detailed contents for carrying out the present invention will be described in detail with reference to the accompanying drawings. Throughout the drawings, the same reference numbers denote the same components, and "and/or" includes each and all of one or more combinations of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, when an element such as a layer, a film, a region, or a plate is referred to as being "on" another element, it may be directly on another element or may be on another element with the other element interposed therebetween.

In the present specification, a "viscosity" is a value measured at a shear rate of $1s^{-1}$ using a Brookfield rotary viscometer at a corresponding slurry temperature of each process, and has a tolerance of ±500 cP.

The present invention provides a fabrication method of a multilayer electrode for a secondary battery, including: (a) preparing two or more electrode slurries each containing an electrode active material, a binder, and a solvent and heating at least one electrode slurry selected from the prepared two or more electrode slurries to a temperature lower than a boiling point ($T_b$) of the solvent contained in the selected electrode slurry; (b) coating the two or more electrode slurries on a current collector; and (c) cooling the coated two or more electrode slurries.

(a1) First, the two or more electrode slurries each containing the electrode active material, the binder, a conductive material, and the solvent are prepared. In this case, the two or more electrode slurries may refer to electrode slurries in which contents (wt %) of binders with respect to a slurry solid (the electrode active material, the binder, and the conductive material) excluding the solvent are different from each other.

The solid in the electrode slurry may be contained in an amount of more than 50 wt %, specifically more than 50 wt % and 80 wt % or less, and more specifically, more than 55 wt % and 65 wt % or less, based on the electrode slurry.

In general, in a fabrication process of an electrode for a secondary battery, a slurry should have a viscosity of about 1,000 cp to 10,000 cp at 25° C. in order to facilitate a slurry coating work and fabricate the electrode having a uniform thickness. However, in a case where the electrode slurry is prepared so that a content of the solid in the electrode slurry is 60 wt % or more by decreasing a content of the solvent in the electrode slurry by a conventional method, a viscosity of the electrode slurry becomes 50,000 cP or more, such that fluidity of the electrode slurry decreases rapidly, resulting in low workability, the electrode having a non-uniform thickness is fabricated, and an adhesion between the current collector and an electrode active material layer in the electrode decreases. Therefore, the conventional electrode slurry contains about 50 wt % of solid.

On the other hand, in the present invention, a fluidity problem may be solved by heating a high-viscosity electrode slurry. However, in a case where the solid exceeds the above-mentioned weight range, when the electrode slurry is prepared, the electrode slurry does not contain a minimum solvent required for dispersing solid particles, such that a shear force for dispersing the solid particles is not sufficiently at work, and the solid particles in the electrode slurry may thus be coated on the current collector in a state in which they are non-uniformly dispersed, and in a case where the solid is less than the above-mentioned weight range, fluidity of the slurry is already sufficient, such that there is no need to apply a technology proposed in the present invention.

A viscosity ($A_1$) of the two or more electrode slurries before being heated may be at least 20,000 cP or more, preferably 20,000 to 70,000 cP, and more preferably 30,000 to 60,000 cP at 25° C.

In a case where the viscosity ($A_1$) of the electrode slurry is less than 20,000 cP at 25° C. due to an increase in the content of the solvent in the electrode slurry, an amount of the solvent contained in the electrode slurry is large, such that an adhesion between the electrode active material layer and the current collector is weakened due to a migration phenomenon of the binder, and long-term stability may thus be decreased.

In a case where the viscosity ($A_1$) of the electrode slurry exceeds 70,000 cP at 25° C., even though the content of the solid (particularly, the electrode active material and the binder) increases, an increase in the adhesion between the electrode active material layer and the current collector is insignificant.

Specifically, a weight ratio (content ratio) of the electrode active material: the binder in the solid may be 1:0.01 to 0.1, specifically 1:0.01 to 0.08, and more specifically 1:0.02 to 0.05.

The electrode active material is not particularly limited as long as it is an electrode active material usually used for the secondary battery. A negative electrode active material may be, for example, a carbon-based negative electrode active material, a silicon-based negative electrode active material, or a mixture thereof, but is not limited thereto. The carbon-based negative electrode active material may be one or more selected among artificial graphite, natural graphite, and hard carbon. The silicon-based negative electrode active material may be Si, $SiO_x$ (0<x<2), a Si—Q alloy (here, Q is an element selected from the group consisting of alkali metals, alkaline earth metals, Group XIII elements, Group XIV elements, Group XV elements, Group XVI elements, transition metals, rare earth elements, and combinations thereof and is not Si), a Si-carbon composite, or a mixture of at least one of them and $SiO_2$. A positive electrode active material may be a composite oxide of a metal selected from cobalt, manganese, nickel, and combinations thereof and lithium, but is not limited thereto.

The binder is not particularly limited as long as it is a conventional binder capable of serving to bind the electrode active material to the current collector well while binding electrode active material particles to each other well. As an example, the binder may be a water-soluble binder, specifically, styrene-butadiene rubber, acrylated styrene-butadiene rubber, polyvinyl alcohol, sodium polyacrylate, a copolymer of propylene and olefin having 2 to 8 carbon atoms, polyacrylamide, a copolymer of (meth)acrylic acid and (meth)acrylic acid alkyl ester, or combinations thereof.

In a case where the water-soluble binder is used, the water-soluble binder may bind the electrode active material to the current collector well without affecting a viscosity of a slurry, but since the slurry may easily gel due to the electrode active material and a conductive material, which are fine particles, a thickener for making the slurry stable by imparting a viscosity to the slurry may be further included. As an example, the thickener may be a mixture of one or more of cellulose-based compounds, specifically, carboxymethyl cellulose, hydroxypropylmethyl cellulose, methyl cellulose, or alkali metal salts thereof. As an alkali metal, Na, K, or Li may be used.

The solvent is not particularly limited as long as it is a solvent usually used for the electrode slurry. Specifically, a solvent for a negative electrode may be at least one selected from the group consisting of water, pure water, deionized water, distilled water, ethanol, isopropanol, methanol, acetone, n-propanol and t-butanol, but is not limited thereto. A solvent for a positive electrode may be at least one selected from the group consisting of an amine-based solvent such as N,N-dimethylaminopropylamine and diethyltriamine; an ether-based solvent such as ethylene oxide and tetrahydrofuran; a ketone-based solvent such as methyl ethyl ketone; an ester-based solvent such as methyl acetate; and a polar aprotic solvent such as dimethylacetamide and N-methyl-2-pyrrolidone, but is not limited thereto.

The conductive material is used to impart conductivity to the electrode, and is not particularly limited as long as it is a conventional electrically conductive material that does not cause a chemical change in the secondary battery. As an example, the conductive material may be natural graphite, artificial graphite, carbon black, acetylene black, ketjen black, carbon fiber, carbon nanotube, and combinations thereof, but is not limited thereto.

The current collector may be one selected from the group consisting of copper foil, nickel foil, stainless steel foil, titanium foil, nickel foam, copper foam, a polymer substrate coated with a conductive metal, and combinations thereof, but is not limited thereto.

(a2) Then, at least one selected from the prepared two or more high-viscosity electrode slurries is heated to the temperature lower than the boiling point ($T_b$) of the solvent contained in the selected high-viscosity electrode slurry.

Therefore, the selected high-viscosity electrode slurry is heated at the temperature lower than the boiling point, such that the viscosity of the selected high-viscosity electrode slurry may be decreased to a viscosity at which a work is easy and the electrode having a uniform thickness may be formed. Therefore, in the fabrication method of a multilayer electrode for a secondary battery according to the present invention, the two or more high-viscosity electrode slurries containing a high content of solid may be used, and at least one selected from the two or more high-viscosity electrode slurries may be coated on the current collector in a state in which it is heated to have a decreased viscosity.

However, in a case where a heating temperature of the electrode slurry is higher than or equal to the boiling point of the solvent, when the heated electrode slurry is transferred and stored, a strong vapor pressure is generated in a pipe or a storage container for transferring the electrode slurry, which may cause a risk such as water leakage or explosion.

Therefore, the heating may be performed at the temperature lower than the boiling point of the solvent contained in the electrode slurry.

Specifically, the heating temperature (T) may satisfy the following Relational Equation 1.

$$0.3T_b < T < 0.9T_b \qquad \text{[Relational Equation 1]}$$

In the above Relational Equation 1, $T_b$ is the boiling point of the solvent contained in the selected electrode slurry.

In the above Relational Equation 1, $0.35\ T_b<T<0.9\ T_b$, preferably $0.4\ T_b<T<0.85\ T_b$, and more preferably $0.5\ T_b<T<0.8\ T_b$.

A viscosity ($A_2$) of the heated electrode slurry may be 5,000 to 10,000 cP, preferably 7,000 to 9,800 cP, and more preferably 8,000 to 9,500 cP at a corresponding temperature of each electrode slurry.

(b) The two or more electrode slurries are coated on the current collector. In this case, the coating may be performed without heating (raising a temperature of) the electrode slurry and a substrate (current collector).

As a non-restrictive example, the coating may be performed using any coating method known to be used for forming a film by generally coating a liquid phase. For example, the coating may be performed using spray coating, dip coating, spin coating, gravure coating, slot die coating, doctor blade coating, roll coating, inkjet printing, flexography printing, screen printing, electrohydrodynamic inkjet printing, micro contact printing, imprinting, reverse offset printing, bar-coating, gravure offset printing, and the like, but is not limited thereto.

An electrode slurry in which a content of a binder with respect to the slurry solid is higher, of the two or more electrode slurries may be coated on a place close to the current collector, and the two or more electrode slurries may be simultaneously or sequentially coated on the current collector. As an example, a first electrode slurry containing a first electrode active material, a first binder, and a first solvent and a second electrode slurry containing a second electrode active material, a second binder, and a second solvent may be prepared, the heated first electrode slurry may be coated on the current collector, and the heated second electrode slurry may be then coated on the first electrode slurry. In this case, a content (wt %) of the first binder with respect to a total weight of a solid in the first electrode slurry may be higher than a content (wt %) of the second binder with respect to a total weight of a solid in the second electrode slurry.

(c) The coated two or more electrode slurries are cooled.

The cooling is performed at a temperature of 10 to 30° C., specifically 10 to 25° C., and more specifically 15 to 25° C., for 1 to 60 seconds, specifically 2 to 30 seconds, and more specifically 5 to 10 seconds, immediately after at least one selected from the two or more electrode slurries is heated and coated on the current collector.

The heated electrode slurry is cooled, such that the viscosity of the electrode slurry may be restored to a high viscosity again. Therefore, in the fabrication method of a multilayer electrode for a secondary battery according to the present invention, the two or more high-viscosity electrode slurries containing the high content of solid are used, at least one selected from the two or more high-viscosity electrode slurries is coated on the current collector in a state in which it is heated to have the decreased viscosity, and the coated electrode slurry immediately after being coated is cooled, such that the viscosity of the electrode slurry is restored to the high viscosity again, and a migration phenomenon of the binders occurring in a subsequent drying process may thus be suppressed. Therefore, the present invention may provide the multilayer electrode having an improved adhesion between the current collector and the electrode active material layer and prevent a problem such as a decrease in fluidity and non-uniformity of a thickness of the electrode that may be caused by the high viscosity.

A viscosity ($A_3$) of the cooled electrode slurry of the selected electrode slurry may be 10,000 cP to 60,000 cP, preferably 13,000 cP to 55,000 cP, more preferably 25,000 cP to 50,000 cP, and even more preferably 35,000 cP to 45,000 cP at a corresponding temperature of each slurry.

That is, the selected electrode slurry may satisfy the following Relational Equations 2' and 3'.

$$A_2 < A_1 \qquad \text{[Relational Equation 2']}$$

$$A_2 < A_3 \qquad \text{[Relational Equation 3']}$$

In the above Relational Equations 2' and 3', $A_1$ is a viscosity of the selected electrode slurry before being heated, $A_2$ is a viscosity of the heated electrode slurry of the selected electrode slurry, and $A_3$ is a viscosity of the cooled electrode slurry of the selected electrode slurry.

However, even though the heated electrode slurry is cooled within a limited time, the heated electrode slurry may not be cooled to the temperature of the electrode slurry before being heated, and the viscosity of the electrode slurry restored by cooling the heated electrode slurry may thus be lower than that of the electrode slurry before being heated. Therefore, the above Relational Equations 2' and 3' may be organized as $A_2<A_3\leq A_1$, but are not limited thereto.

In an embodiment, the viscosity of the selected electrode slurry is decreased to ⅓ or less after the selected electrode slurry is heated, and may be restored to a viscosity similar to an original viscosity again when the heated electrode slurry is cooled.

That is, the above Relational Equations 2' and 3' may be organized again as the following Relational Equations 2 and 3.

$$1.3 \leq A_1/A_2 \leq 12 \qquad \text{[Relational Equation 2]}$$

In the above Relational Equation 2, $2\leq A_1/A_2\leq 11$, specifically $3\leq A_1/A_2<10$, and more specifically, $5\leq A_1/A_2\leq 7$.

$$1.1 \leq A_3/A_2 \leq 10 \qquad \text{[Relational Equation 3]}$$

In the above Relational Equation 3, $1.5\leq A_3/A_2\leq 9$, specifically $2.5\leq A_3/A_2<7$, and more specifically, $4\leq A_3/A_2\leq 5$.

In addition, the fabrication method of a multilayer electrode for a secondary battery according to the present invention may further include (d) drying the cooled electrode slurries. In this case, the drying may be performed at a temperature of 90° C. or more and less than 180° C., preferably 95 to 160° C., more preferably 100 to 140° C., and most preferably 100 to 135° C. for 45 seconds to 5 minutes, preferably 1 to 4 minutes, and more preferably, 1 to 3 minutes.

The present invention also provides a multilayer electrode for a secondary battery, including: a current collector; a first electrode layer formed on the current collector and containing a first electrode active material and a first binder; and a second electrode layer formed on the first electrode layer and containing a second electrode active material and a second binder, wherein a content (wt %) of the first binder with respect to a total weight of the first electrode layer is higher than a content (wt %) of the second binder with respect to a total weight of the second electrode layer, and an adhesion of the first electrode layer to the current collector is 0.2 N/cm or more.

Generally, in a multilayer electrode having a structure in which electrode layers containing different contents of binders are stacked, interlayer mixing occurs due to a diffusion phenomenon between the respective layers in a drying step in an electrode fabricating process, such that a difference between contents of the binders contained in the respective electrode layers of the fabricated multilayer electrode is significantly decreased as compared with a difference between contents of the binders in the electrode slurries before the respective electrode layers are formed. That is, a multilayer form of the electrodes may not be maintained, such that an adhesion improvement effect between the electrode layer and the current collector and a resistance improvement effect that are expressed in the multilayer structure decrease or disappear.

However, the binders contained in the respective electrode layers of the multilayer electrode for a secondary battery according to the present invention may be maintained in distributions similar to contents of the binders in the respective electrode slurries corresponding to the respective electrode layers, such that an adhesion of the electrode layer to the current collector may be significantly increased. Specifically, an adhesion of the first electrode layer to the current collector may be 0.2 N/cm or more, specifically 0.20 to 1.5 N/cm, and more specifically 0.22 to 0.5 N/cm.

The first electrode layer and the second electrode layer may satisfy the following Relational Equation 4.

$$0.5 < R_e/R_s < 1 \qquad \text{[Relational Equation 4]}$$

In the above Relational Equation 4, $R_s$ is a difference $(B_{1s}-B_{2s})$ between a content $(B_{1s})$ (wt %) of a binder with respect to a solid in the first electrode slurry coated on the current collector in order to form the first electrode layer and a content $(B_{2s})$ (wt %) of a binder with respect to a solid in the second electrode slurry coated on the first electrode slurry in order to form the second electrode layer, and $R_e$ is a difference $(B_{1e}-B_{2e})$ between a content $(B_{1e})$ (wt %) of a binder in the first electrode layer in the multilayer electrode and a content $(B_{2e})$ (wt %) of a binder in the second electrode layer in the multilayer electrode.

In the above Relational Equation 4, $0.6<R_e/R_s<1$, specifically $0.7<R_e/R_s<1$, and more specifically $0.75<R_e/R_s<1$.

In the multilayer electrode according to an embodiment of the present invention, the electrode layer may be uniformly formed in a length direction (width direction), and specifically, a loading weight of the electrode layer may be uniform.

Specifically, in the multilayer electrode, a difference between a maximum loading value and a minimum loading value of the electrode layer at five or more positions having regular intervals in the length direction may be 10% or less, for example, 9% or less, 8% or less, or 7% or less, of a total loading average value. Therefore, the above-described effect may be further improved.

In this case, the loading may refer to a weight of an electrode active material slurry solid or a weight of an electrode layer of an electrode finally formed after an electrode slurry coated on an electrode current collector is dried, and as a non-restrictive example, after a specimen is obtained by punching at least five points having regular intervals in a length direction (width direction) of the electrode in a circular shape, the weight of the electrode active material slurry solid or the electrode layer in the specimen may be measured.

Therefore, the multilayer electrode according to the present invention may have an improved adhesion to the substrate (current collector) due to the solid uniformly dispersed in the electrode layer.

In addition, the present invention provides a secondary battery including the multilayer electrode described above; a separator; and an electrolyte.

In detail, the multilayer electrode according to the present invention may have an improved adhesion to a substrate and uniformity of a thickness. Therefore, the secondary battery including the multilayer electrode described above may have further improved long-term stability.

The multilayer electrode may be a positive electrode or a negative electrode depending on a type of the electrode active material contained in the electrode layer. The electrode active material is not particularly limited as long as it is an electrode active material usually used for the secondary battery. A negative electrode active material may be, for example, a carbon-based negative electrode active material, a silicon-based negative electrode active material, or a mixture thereof, but is not limited thereto. The carbon-based negative electrode active material may be one or more selected among artificial graphite, natural graphite, and hard carbon. The silicon-based negative electrode active material may be Si, $SiO_x$ ($0<x<2$), a Si—Q alloy (here, Q is an element selected from the group consisting of alkali metals, alkaline earth metals, Group XIII elements, Group XIV elements, Group XV elements, Group XVI elements, transition metals, rare earth elements, and combinations thereof and is not Si), a Si-carbon composite, or a mixture of at least one of them and $SiO_2$. A positive electrode active material may be a composite oxide of a metal selected from cobalt, manganese, nickel, and combinations thereof and lithium, but is not limited thereto.

The separator is not particularly limited as long as it is a separator known in the art. For example, the separator may be selected among glass fiber, polyester, polyethylene, polypropylene, polytetrafluoroethylene, or combinations thereof, may be in the form of a non-woven fabric or a woven fabric, and may optionally be used in a single-layer or multi-layer structure.

The electrolyte includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), γ-butyrolactone (BL), tetrahydrofuran (THF), 1,3-dioxolane (DOL), diethyl ester (DEE), methyl formate (MF), methyl propionate (MP), sulfolane (S), dimethyl sulfoxide (DMSO), acetonitrile (AN), or a mixture thereof, but is not limited thereto. The electrolytic salt is a material dissolved in the non-aqueous organic solvent, acting as a supply source of electrolytic metal ions in the secondary battery to enable a basic operation of the secondary battery, and promoting movement of the electrolytic metal ions between the positive electrode and the negative electrode. As a non-restrictive example, in a case where an electrolytic metal is lithium, the electrolytic salt may be $LiPF_6$, $LiBF_4$, LiTFSI, $LiSbF_6$, $LiAsF_6$, $LiClO_4$, $LiCF_3SO_3$, $Li(CF_3SO_2)_2$N, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl, LiI, or a mixture thereof, but is not limited thereto. In addition, the electrolyte salt may be a known material used in a concentration suitable for the purpose, and may further, if necessary, include a known solvent or additive in order to improve charging/discharging characteristics, flame-retardant characteristics, and the like.

Example 1

Step 1: Preparation of First Negative Electrode Slurry

Water was added to 93.4 wt % of artificial graphite, 3.0 wt % of a carbon black conductive agent, 2.4 wt % of a styrene-butadiene rubber (SBR) binder, and 1.2 wt % of carboxymethyl cellulose (CMC), and mixing was then performed at room temperature for 120 minutes to prepare a first negative electrode slurry (60 wt % of a solid based on a total slurry), and the prepared first negative electrode slurry was stirred in a stirring tank heated to 70° C. for 30 minutes to maintain a temperature of the first negative electrode slurry at 70° C. In this case, a viscosity of the prepared first negative electrode slurry was 60,000 cp, and a viscosity of the prepared first negative electrode slurry after being heated to 70° C. was 9,000 cp (each of the viscosities of the first negative electrode slurry before and after being heated was measured at a shear rate of 1 $s^{-1}$ at a corresponding temperature of each slurry using a rotary viscometer after preparing the first negative electrode slurry at the corresponding temperature).

Step 2: preparation of Second Negative Electrode Slurry

Water was added to 95.2 wt % of artificial graphite, 3.0 wt % of a carbon black conductive agent, 0.6 wt % of a styrene-butadiene rubber (SBR) binder, and 1.2 wt % of carboxymethyl cellulose (CMC), and mixing was then performed at room temperature for 120 minutes to prepare a second negative electrode slurry (60 wt % of a solid based on a total slurry), and the prepared second negative electrode slurry was stirred in a stirring tank heated to 70° C. for 30 minutes to maintain a temperature of the second negative electrode slurry at 70° C. In this case, a viscosity of the prepared second negative electrode slurry was 60,000 cp, and a viscosity of the prepared second negative electrode slurry after being heated to 70° C. was 9,000 cp (each of the viscosities of the second negative electrode slurry before and after being heated was measured at a shear rate of $1s^{-1}$ at a corresponding temperature of each slurry using a rotary viscometer after preparing the second negative electrode slurry at the corresponding temperature).

Step 3: Fabrication of Negative Electrode

The first negative electrode slurry was transferred to a coating die through a pipe heated to 70° C. and a pump, and was coated on each of both surfaces of copper foil (thickness of 6 μm) at a thickness of 50 pm to form preliminary first electrode layers. In this case, the coating die discharging the first negative electrode slurry was also maintained at 70° C. through hot water circulated in the coating die.

Next, the second negative electrode slurry was transferred to the coating die through the pipe heated to 70° C. and the pump, and was coated on each of the preliminary first electrode layers at a thickness of 50 μm to form preliminary second electrode layers. The preliminary first and second electrode layers formed on the copper foil as described above were cooled at room temperature for 10 seconds immediately after the coating and then dried in a drying furnace heated with hot air at 130° C. for 2 minutes to fabricate a negative electrode having a structure of current collector/first electrode layer/second electrode layer and having a final thickness of 60 μm.

Evaluation Example 1: Measurement of Image of Cross Section of Negative Electrode Captured By Sem And Evaluation of Homogeneity of Negative Electrode Active Material Layer

Comparative Example 1

A negative electrode was fabricated in the same manner as in Example 1 except that the first and second negative electrode slurries were directly dried without being heated and cooled after being coated.

Comparative Example 2

A negative electrode was fabricated in the same manner as in Example 1 except that the first and second negative electrode slurries were directly dried without being cooled after being coated.

Comparative Example 3

A negative electrode was fabricated in the same manner as in Example 1 except that each of the first and second negative electrode slurries was prepared so that a content of a solid therein is 50 wt %, the prepared first and second negative electrode slurries were coated at room temperature without being heated, and the first and second negative electrode slurries were directly dried without being cooled after being coated.

Evaluation Method

Figure 2:
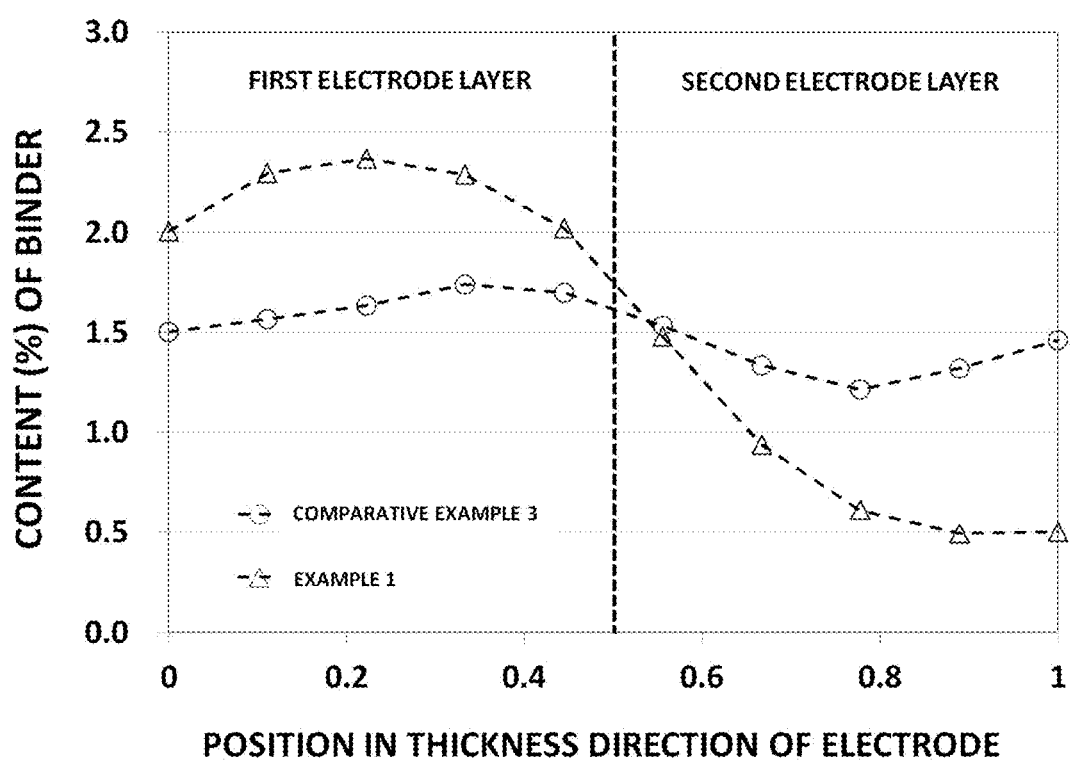
FIG. 2 is graphs illustrating results of distributions of binders in electrode layers according to a thickness direction through results obtained by analyzing cross sections of the multilayer electrodes according to Example 1 and Comparative Example 3 by a scanning electron microscope-energy dispersive X-ray spectroscopy (SEM-EDS).

Measurement of Image of Cross Section of Negative Electrode Captured by SEM-EDS Cross sections of negative electrodes fabricated according to Example 1 and Comparative Example 3 were cut with an ion-milling device and distributions of SBR binders in the negative electrodes were then measured through a scanning electron microscope-energy dispersive X-ray spectroscopy (SEM-EDS), and measurement results were compared and illustrated in FIGS. 1 and 2 and Table 1. In order to detect only the SBR binder, the SBR binder in the negative electrode was pretreated using osmium (Os), and SEM-EDS analysis then was performed. In FIG. 1, a red color indicates the binder.

It can be seen in FIG. 1 that in a case of Example 1, the distributions of the binders decrease as a distance from a current collector increases in a thickness direction of an electrode. This indicates that contents (2.4 wt % and 0.6 wt %) of binders in a first slurry and a second slurry before being coated on the current collector were maintained well in first and second electrode layers after these slurries are coated and dried.

On the other hand, it can be seen that in a case of Comparative Example 3, the distributions of the binders are uniform in the entire thickness direction of the electrode. That is, it can be seen that contents (2.4 wt % and 0.6 wt %) of binders in a first slurry and a second slurry before being coated on the current collector were no longer maintained in initial binder distributions due to an interlayer (first and second layers) binder mixing phenomenon occurring in a coating and drying process, and the binders were uniformly distributed in the entire thickness direction.

Content values of the binders according to the thickness direction of the electrode of FIG. 2 were shown in the following Table 1. Specifically, $B_{1s}$ is a content (wt %) of a binder with respect to a solid in the first slurry, $B_{2s}$ is a content (wt %) of a binder with respect to a solid in the second slurry, $B_{1e}$ is a content (wt %) of a binder in the first electrode layer, and $B_{2e}$ is a content (wt %) of a binder in the second electrode layer.

TABLE 1

|  | Content (wt %) of binder in slurry | | | Content (wt %) of binder in electrode layer | | | |
| --- | --- | --- | --- | --- | --- | --- | --- |
|  | $B_{1s}$ | $B_{2s}$ | $R_s$ ($B_{1s}$ − $B_{2s}$) | $B_{1e}$ | $B_{2e}$ | $R_e$ ($B_{1e}$ − $B_{2e}$) | $R_e/R_s$ |
| Example 1 | 2.4 | 0.6 | 1.8 | 2.2 | 0.8 | 1.4 | 0.78 |
| Comparative Example 3 | 2.4 | 0.6 | 1.8 | 1.6 | 1.4 | 0.2 | 0.11 |

As can be seen in Table 1, in a case of Example 1, a ratio of an difference ($R_e$) between contents of the binders in the first and second electrode layers to a difference ($R_s$) between contents of the binders in the initial first and second slurries was 0.78, and even after the electrode was formed, the contents of the binders showed values almost similar to the binder distributions in the initial slurries. This result is decided to appear by an effect of suppressing an interlayer mixing phenomenon of the binders in the slurries by restoring a viscosity of the slurries back to an initial viscosity of 60,000 cp through a cooling process after heating. It is decided that the binders in each of the fabricated electrode layers are maintained in the contents of the binders in the initial slurries due to the suppression of the interlayer mixing of the binders described above.

In a case of Comparative Example 3, in order to secure fluidity of the slurry to ensure uniform coating, slurries containing 50 wt % of a solid and having a viscosity of 8,500 cp were used, and were directly coated and dried on the current collector without a separate heating and cooling process. Therefore, it is decided that a mixing phenomenon of the binders in the coated first and second slurries occurs in a drying process due to fluidity of the slurries having the viscosity described above, such that a difference between the contents of the binders in the first and second electrode layers after the drying process is significantly decreased as compared with the initial slurries. Due to such a decrease in the difference between the contents of the binders in the first and second electrode layers, eventually, an adhesion between the first electrode layer and the current collector may be significantly decreased, and a resistance of the electrode may be increased to decrease performance of a battery including the electrode.

Figure 3:
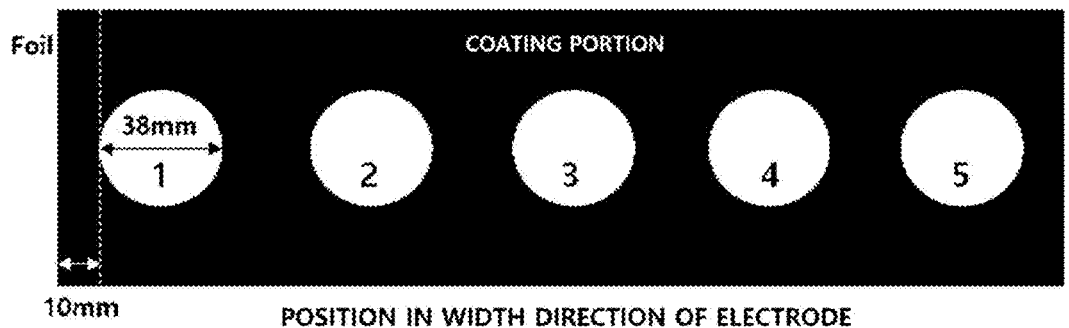
FIG. 3 is a schematic diagram of a specimen obtained by selecting five points having regular intervals in a length direction (width direction) of the electrode layer and punching the selected five points in a circular shape having a diameter of 38 mm in order to evaluate homogeneity of the electrode layer.

Evaluation of Uniformity of Coating of Negative Electrode Active Material Layer in Width Direction In order to analyze homogeneity of coating, in a width direction, of negative electrode active material layers fabricated in Example 1 and Comparative Example 1, as illustrated in FIG. 3, five points having regular intervals in a length direction of the negative electrode active material layers were selected and punched in a circular shape having a diameter of 38 mm, and weights of the negative electrode active material layers in punched specimens were then measured to analyze loading weights of the negative electrode active material layers in the negative electrodes. Values obtained by dividing weights of the negative electrode active material layer (loading weights of a composition of the negative electrode active material layer) measured for each point by a total length of the negative electrode active material layer to normalize the weights are illustrated in FIG. 4.

Figure 4:
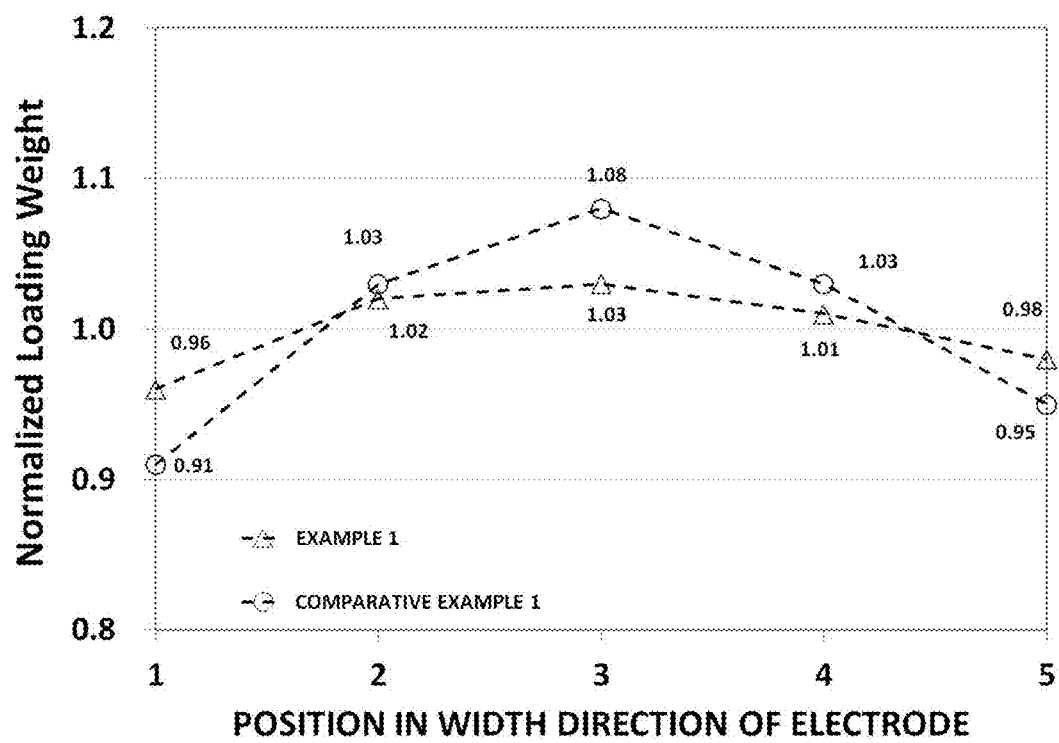
FIG. 4 is graphs illustrating results obtained by dividing weights of the electrode layer (loading weights of the electrode layer) measured for each position of multilayer electrodes according to Example 1 and Comparative Example 1 according to a length direction (width direction) by a total weight of the electrode layer to normalize the weights.

It can be seen in FIG. 4 that in a case of Example 1 in which the slurry was coated in a state in which the slurry was heated to have the decreased viscosity, and was then subjected to a cooling and drying process, a difference between loading values (maximum value−minimum value) of the negative electrode active material layer was 7% of a total loading average value measured at five points, which is very low, while in a case of Comparative Example 1 in which the slurry was directly subjected to a drying process after being coated in a state in which it has a high viscosity without being heated, a difference between loading values of the negative electrode active material layer was 17% of a total loading average value measured at five points, which shows a non-uniform distribution in which a loading weight of a central portion is high and a loading weight of an outer side portion is low.

Evaluation Example 2: Evaluation of Adhesion Between Active Material Layer and Current Collector According to Change in Content of Solid Of Negative Electrode Slurry Examples 2 to 4 and Comparative Examples 3 and 3

Negative electrodes were fabricated in the same manner as in Example 1 except that the viscosities of the negative electrode slurries were changed as described in Table 2 by changing contents of the solids and heating temperatures of the slurries at the time of preparing of the first and second negative electrode slurries. In this case, the heating temperatures of Examples 2 to 4 were adjusted so that the viscosities of each slurry were 8,500 to 9,500 cp.

Evaluation Method

Evaluation of Interfacial Adhesion Between Negative Electrode Active Material Layer and Current Collector Each of the negative electrodes fabricated in Examples 2 to 4 and Comparative Examples 2 and 3 was cut at a width of 18 mm and a length of 150 mm, and a tape having a width of 18 mm was attached to a foil layer of the negative electrode and then allowed to be sufficiently adhered to the foil layer with a roller having a load of 2 kg. The negative electrode active material layer was attached to one side of a tensile tester using a double-sided tape. The tape attached to the foil layer was fastened to the other side of the tensile tester, measurement of an adhesion was performed, and measurement results were shown in Table 2. Here, the negative electrode active material layer refers to first and second electrode layers.

TABLE 2

| | Content (wt %) of solid | $A_1$ before being heated | $A_2$ after being heated | $A_3$ after being cooled | Viscosity ratio ($A_1/A_2$) | Viscosity ratio ($A_3/A_2$) | Adhesion (N/cm) |
|---|---|---|---|---|---|---|---|
| | | Viscosity (cP) of negative electrode slurry | | | | | |
| Example 1 | 60 | 60,000 | 9,000 | 43,000 | 6.7 | 4.8 | 0.28 |
| Example 2 | 57 | 34,000 | 9,500 | 29,000 | 3.6 | 3.1 | 0.26 |
| Example 3 | 53 | 12,000 | 8,800 | 11,000 | 1.4 | 1.3 | 0.21 |
| Example 4 | 55 | 20,000 | 8,500 | 16,000 | 2.4 | 1.9 | 0.22 |
| Comparative Example 2 | 60 | 60,000 | 9,000 | — | 6.7 | — | 0.19 |
| Comparative Example 3 | 50 | 8,500 | 8,500 | 8,500 | 1.0 | 1.0 | 0.16 |

In Table 2, the content (wt %) of the solid is contents of solids in the first and second negative electrode slurries, and the contents of the solids in the first and second negative electrode slurries have the same value within an error range of ±3%. In addition, the viscosity of the negative electrode slurry is viscosities of the first and second negative electrode slurries, and the viscosities of the first and second negative electrode slurry have the same value within an error range of ±5%. Each viscosity of the negative electrode slurry before and after being heated and after being cooled was measured at a shear rate of 1 $s^{-1}$ at a corresponding temperature of each slurry using a rotary viscometer after preparing the negative electrode slurry at corresponding temperatures.

It can be seen in Table 2 that in a case of Examples 1 to 4 in which the slurry was subjected to the heating and cooling process and the contents of the solids were 53 to 60%, the viscosity of the coated slurry was high, such that fluidity of the slurry was decreased to be able to suppress interlayer mixing due to a migration phenomenon of binders, and an adhesion between the negative electrode material layer, specifically, the first electrode layer and the current collector was increased.

On the other hand, it was decided that in a case of Comparative Example 2, the slurry was coated in a state in which it was heated to have the decreased viscosity, and was then dried directly without being cooled, such that interlayer mixing of binders due to an increase in fluidity of the slurry might not be suppressed, and thus, an adhesion was decreased.

In addition, it can be seen that in Comparative Example 3, an adhesion was very low, and it was analyzed that the negative electrode was formed using a slurry at room temperature that is not subjected to a heating and cooling step, a content of the solid in the slurry was not sufficiently high, such that the slurry contained a solvent in a relatively large amount, and a concentration gradient in which a content of the binder is higher in a surface of the negative electrode due to a migration phenomenon of the binders under the same drying condition was formed.

Meanwhile, it can be seen that Examples 3 and 4 showed a tendency to have adhesions somewhat lower than those of Examples 1 and 2 due to a relatively small content of a solid in the slurry, and a content of the solid in a slurry composition for a negative electrode was preferably more than 50 parts by weight and 80 parts by weight or less with respect to 100 parts by weight of the slurry composition for a negative electrode.

Evaluation Example 3: Evaluation of Adhesion Between Active Material Layer and Current Collector According to Change in Drying Condition of Negative Electrode Active Material Slurry Examples 5 to 8

Negative electrodes were fabricated in the same manner as in Example 1 except that the drying process of the coated preliminary first and second electrode layers was changed as described in Table 3, in Step 3 of Example 1.

Comparative Example 4

A negative electrode was fabricated in the same manner as in Comparative Example 3 except that the drying process of Comparative Example 3 was changed as described in Table 3.

Evaluation Method

Evaluation of Interfacial Adhesion Between Negative Electrode Active Material Layer and Current Collector An evaluation was performed in the same manner as in Evaluation Example 2, and evaluation results were shown in Table 3.

TABLE 3

| | Content (wt %) of solid | Drying temperature (° C.) | Drying time (Minute) | Adhesion (N / cm) |
|---|---|---|---|---|
| Example 1 | 60 | 130 | 2 | 0.28 |
| Example 5 | 60 | 120 | 3 | 0.31 |
| Example 6 | 60 | 110 | 4 | 0.33 |
| Example 7 | 60 | 150 | 1.5 | 0.22 |
| Example 8 | 60 | 160 | 1.5 | 0.21 |
| Comparative Example 4 | 50 | 110 | 4 | 0.19 |

In Table 3, the content (wt %) of the solid is contents of solids in the first and second negative electrode slurries, and the contents of the solids in the first and second negative electrode slurries have the same value within an error range of ±3%.

It can be seen in Table 3 that in a case where a drying temperature is a low temperature of 130° C. or less (Examples 1, 5, and 6), a drying time was increased in order to evaporate the solvent, but a migration phenomenon of the binders was suppressed, such that an adhesion between the active material layer and the current collector was increased.

On the other hand, it can be seen that in a case where a drying temperature is higher than 150° C. (Examples 7 and 8), active material particles were easily exposed to a surface of the solvent in the drying process due to rapid drying, and as a result, a migration phenomenon due to a capillary phenomenon was intensified, such that an adhesion between the active material layer and the current collector was decreased. In addition, it can be seen that in a case of a conventional slurry in which a content of a solid is 50 wt % (Comparative Example 4), an adhesion between the active material layer and the current collector was the lowest in spite of performing the same drying process as in Example 6, which is a condition in which the adhesion is the most excellent.

The fabrication method of a multilayer electrode for a secondary battery according to the present invention may provide an electrode for a secondary battery having an improved adhesion between the current collector and the electrode active material layer and prevent a problem such as a decrease in fluidity and non-uniformity of a thickness of the electrode that may be caused by the high viscosity.

What is claimed is:

1. A fabrication method of a multilayer electrode for a secondary battery, comprising:
   (a) preparing two or more electrode slurries each containing an electrode active material, a binder, and a solvent and heating at least one electrode slurry selected from the prepared two or more electrode slurries to a temperature lower than a boiling point ($T_b$) of the solvent contained in the selected electrode slurry;
   (b) coating the two or more electrode slurries on a current collector; and
   (c) cooling the coated two or more electrode slurries, wherein the selected electrode slurry satisfies the following Relational Equations 2 and 3, and a viscosity (A1) of the electrode slurry before being heated is 20,000 cp or more, and a viscosity (A2) of the heated electrode slurry is 7,000 to 9,800 cp, $$1.3 \leq A_1/A_2 \leq 12 \qquad \text{[Relational Equation 2]}$$

$$1.1 \leq A_3/A_2 \leq 10 \qquad \text{[Relational Equation 3]}$$

wherein A1 is a viscosity of the selected electrode slurry before being heated, A2 is a viscosity of the heated electrode slurry of the selected electrode slurry, and A3 is a viscosity of the cooled electrode slurry of the selected electrode slurry.

2. The fabrication method of a multilayer electrode for a secondary battery of claim 1, wherein contents of binders with respect to slurry solids in the two or more electrode slurries are different from each other.

3. The fabrication method of a multilayer electrode for a secondary battery of claim 2, wherein an electrode slurry in which a content of a binder with respect to the slurry solid is higher, of the two or more electrode slurries is coated on a place close to the current collector.

4. The fabrication method of a multilayer electrode for a secondary battery of claim 1, wherein in the coating (b) of the two or more electrode slurries, the two or more electrode slurries are simultaneously or sequentially coated on the current collector.

5. The fabrication method of a multilayer electrode for a secondary battery of claim 1, further comprising (d) drying the cooled two or more electrode slurries.

6. The fabrication method of a multilayer electrode for a secondary battery of claim 5, wherein the drying is performed at a temperature of 90° C. or more and less than 180° C. for 45 seconds to 5 minutes.

7. The fabrication method of a multilayer electrode for a secondary battery of claim 1, wherein a heating temperature (T) of the heating satisfies the following Relational Equation 1:

$$0.3T_b < T < 0.9T_b \qquad \text{[Relational Equation 1]}$$

wherein $T_b$ is the boiling point of the solvent contained in the selected electrode slurry.

8. The fabrication method of a multilayer electrode for a secondary battery of claim 1, wherein the cooling is performed at a temperature of 10 to 30°° C. for 1 to 60 seconds.

9. The fabrication method of a multilayer electrode for a secondary battery of claim 1, wherein a content of a solid of each of the two or more electrode slurries is more than 50 wt % and 80 wt % or less.

\* \* \* \* \*